Oct. 15, 1963    E. RUDDER    3,107,100
HIGH PRESSURE-LOW TEMPERATURE GASKET
Filed Feb. 27, 1961

Elbert Rudder,
INVENTOR.

BY

ATTORNEYS.

3,107,100
HIGH PRESSURE-LOW TEMPERATURE GASKET
Elbert Rudder, Rte. 2, Madison, Ala.
Filed Feb. 27, 1961, Ser. No. 92,108
1 Claim. (Cl. 277—198)
(Granted under Title 35, U.S. Code (1952), sec. 266)

The invention described herein may be manufactured and used by or for the Government for governmental purposes without the payment of any royalty thereon.

This invention relates to an improved gasket and more particularly to a gasket which will give a tight seal between two parts or flanges, even at very low temperatures, over a wide pressure range, including high pressures. Such circumstances of extremely low temperatures and wide pressure range occur in modern rockets and missiles utilizing liquid oxygen as an oxidizer.

Commercial gaskets, presently available, have been utilized in an attempt to obtain a suitable seal for use in present rockets and missiles but have been found to be deficient for various reasons, i.e., uneven contraction and expansion of the gasket materials and the material of the parts being sealed; composition of the gasket would not withstand the extremely low temperatures encountered and brittleness and cracking would readily become apparent. A complete and positive seal was difficult to achieve unless a large amount of connecting force could be applied and this was impossible in various circumstances. Even though a considerable connecting force could be applied, "after setting" often resulted. "After setting" may be defined as the deformation of the gasket body into a smaller sealing thickness as a result of continued application of a connecting force.

Furthermore, seals of the O-ring construction utilizing a solid metallic core and enclosed in a jacket of plastic like material have proven deficient in that brittleness and lack of resiliency cause rupture or permanent deformation of the seal.

It is, therefore, an object of the present invention to provide an improved gasket which effectively maintains a positive seal at low temperatures and high pressures.

A feature of the present invention is the provision of sealing members having sufficient resiliency to permit repeated assembly and disassembly without rupture or permanent deformation to the sealing members.

The present invention utilizes a sealing member for use in systems having low temperatures and high pressures. The sealing member is comprised of an outer jacket of asbestos fiber material substantially in a Y-shaped configuration having an inner resilient member sandwiched therein and bonded to the inner side thereof.

Other advantages, objects and features of the present invention will become readily apparent to one skilled in the art from the following description taken in conjunction with the accompanying drawings in which.

Figure 1:
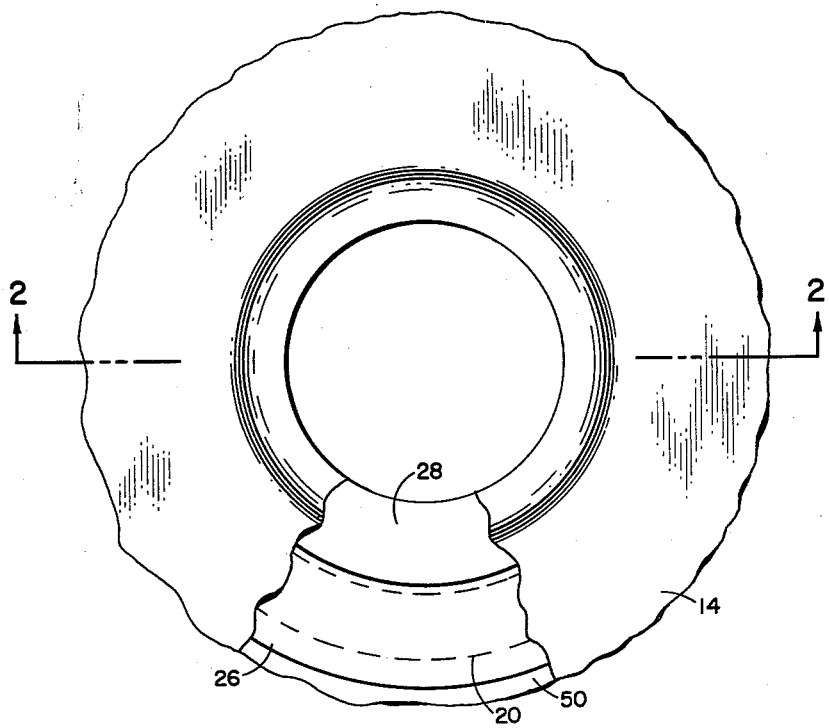
FIGURE 1 is an elevational view of the gasket as would be used between two opposing flanges.
Figure 2:
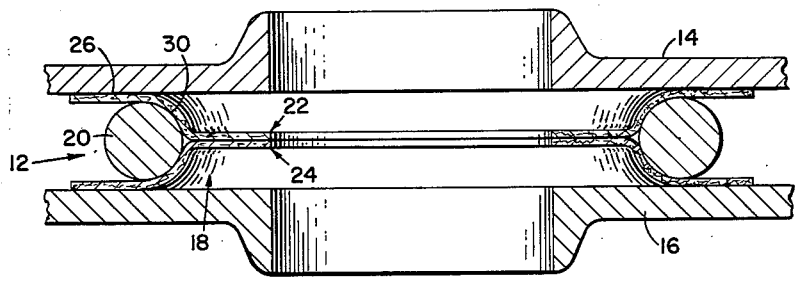
FIGURE 2 is a cross sectional view taken along line 2—2 of FIGURE 1 and shows the gasket as would be used between two opposing flanges.
Figure 3:
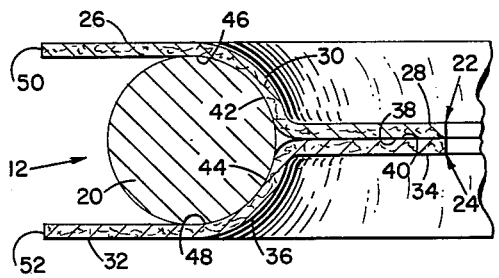
FIGURE 3 is an enlarged cross sectional view of the gasket shown in FIGURE 2.

As shown in FIGURES 1 and 2, a gasket generally indicated by the numeral 12, is in the form of a torus and substantially of a Y-shaped cross sectional configuration. The gasket 12 is placed between two opposing flanges 14 and 16 of a low temperature, high pressure device (not shown) through which flows a medium such as liquid oxygen.

The gasket 12 (FIGURE 2) has an outer continuous jacket 18 of asbestos fiber material of substantially a Y-shaped cross sectional configuration enclosing an inner resilient continuous metallic ring 20 of circular cross sectional configuration.

The continuous jacket 18 is preferably made of two separate layers 22 and 24 of asbestos fiber material. Layer 22 has a leg 26, a second leg 28 and an arcuate intermediate portion 30 integral with and connecting the legs 26 and 28. Layer 24 is similar in configuration to layer 22 and includes a leg 32, a second leg 34 and an arcuate intermediate portion 36 integral with legs 32 and 34.

The separate layers 22 and 24 are disposed oppositely and adhered together by a suitable bonding material, along the inner surfaces 38 and 40 of legs 28 and 34, respectively.

The ring 20 is inserted within the layers 22 and 24 adjacent the inner surfaces 42 and 44 of the arcuate portions 30 and 36, respectively, of jacket 18. The ring 20 is bonded by suitable means to the inner surfaces 46 and 48 of legs 26 and 32, respectively, of the jacket 18.

The terminal edges 50 and 52 of the legs 26 and 32, respectively, are preferably not bonded together. To bond the edges 50 and 52 together would substantially weaken the strength of the asbestos sheets 22 and 24 as a result of the extra bending required for such bonding.

It is of great importance that the ring 20 be of the same material as the parts or flanges 14 and 16 being sealed or at least have substantially the same coefficient of expansion, so that an effective seal may be maintained over the desired temperature range.

It will be noted that the sheet material of jacket 18 is relatively thin as compared to the diameter of the metallic ring 20. Because of this construction and because the outer jacket 18 is made of asbestos fiber material which is very resilient and well adapted to low temperature use, any "after setting" is rendered negligible, inasmuch as line contact between the mating of the flanges with the seal is achieved.

It will further be noted that because of this line contact, only a low order of connecting force is required to effect a leakproof seal and a high specific pressure is built up along this line of contact.

In a seal of the type disclosed in the present invention, all of the characteristics of an ideal seal are apparent. The sealing members are resilient, the seal has substantially the same coefficient of expansion as the members being sealed, whereby repeated assembly and disassembly of the sealed members may be accomplished without injury to the seal.

Furthermore, the seal of the present invention, due to the utilization of a relatively thin outer jacket as compard to the diameter of the inner core permits the line contact between the flanges and the seal wherein the assembly and disassembly may be easily accomplished. This line contact also permits the parts or flanges 14 and 16 to be assembled by connecting forces of a low order and such is desirable in instances wherein space limitations and minimum connecting materials are to be considered as a requirement.

The joint is subjected to an internal fluid pressure, the axial components of which tend to disconnect the joint and are resisted by the bolts connecting the flanges. The radial components of the pressure act on the surfaces 30 and 36 and are resisted by continuous metallic ring 20. The surfaces 30 and 36 provide the seal for the joint.

While in the foregoing description of the present invention, a certain specific embodiment has been disclosed, it will be readily apparent to those skilled in the art that other modifications may be resorted to without departing from the spirit and scope of the invention as defined in the appended claim.

What is claimed is:

In a system having low temperatures and high pressures, a seal interposed between a pair of connecting members comprising: an outer resilient continuous asbestos jacket having a pair of resilient members each provided with a first leg portion, a second leg portion, and an arcuate intermediate portion integral with each of said leg portions, said members disposed oppositely and adhered together to provide said jacket with substantially a Y-shaped cross-sectional configuration; a single inner, resilient, continuous metallic member disposed within said arcuate portions and bonded thereto and having substantially the same coefficient of expansion as the connecting members for even expansion and contraction therewith; said continuous member provided with a circular cross-sectional area for substantially line contact between said connecting members; and said cross-sectional area being substantially greater than the thickness of said jacket to prevent permanent deformation thereof and thus provide for repeated disassembly and reassembly of said seal and connecting members.

References Cited in the file of this patent

UNITED STATES PATENTS

| | | |
|---|---|---|
| 906,761 | White | Dec. 15, 1908 |
| 2,580,546 | Hobson | Jan. 1, 1952 |

FOREIGN PATENTS

| | | |
|---|---|---|
| 13,097 | Great Britain | June 11, 1898 |